United States Patent [19]

Macangus et al.

[11] Patent Number: 4,578,037
[45] Date of Patent: Mar. 25, 1986

[54] SKYDIVING SIMULATOR

[76] Inventors: Alexander Macangus, 16 Chapel Street; Thomas Dickson, 4 Burgess Terrace, both of Edinburgh, Scotland

[21] Appl. No.: 511,348

[22] PCT Filed: Oct. 20, 1982

[86] PCT No.: PCT/GB82/00298
§ 371 Date: Jun. 16, 1983
§ 102(e) Date: Jun. 16, 1983

[87] PCT Pub. No.: WO83/01380
PCT Pub. Date: Apr. 28, 1983

[30] Foreign Application Priority Data

Oct. 20, 1981 [GB] United Kingdom ............... 8131665
Dec. 4, 1981 [GB] United Kingdom ............... 8136577

[51] Int. Cl.⁴ .................. G01M 9/00; A63B 71/02; A63G 31/16
[52] U.S. Cl. ........................... 434/258; 272/2; 434/247
[58] Field of Search .......... 434/247, 254, 258; 272/2; 73/147; 98/43 B, DIG. 7; 182/48, 49, 52

[56] References Cited

U.S. PATENT DOCUMENTS 4,457,509 7/1984 St-Germain ............... 434/258 X

FOREIGN PATENT DOCUMENTS 2016070 9/1979 United Kingdom .
2062557 5/1981 United Kingdom ............... 434/247
2094163 9/1982 United Kingdom ............... 272/2

OTHER PUBLICATIONS

Montgomery Ward Catalog, 1963 Fall & Winter, pp. 1476, 1477 only.

Primary Examiner—Harland S. Skogquist
Attorney, Agent, or Firm—Don B. Finkelstein

[57] ABSTRACT

A skydiving simulator includes a framework (B) and a flying chamber (A) supported within the framework (B). The framework (B) is constituted by a plurality of symmetrically-positioned, inclined girders (1) the lower ends (1a) of which are bolted to a base (4), and the upper ends (1b) of which are interconnected by crosspieces (2). The flying chamber (A) has an air inlet at the base thereof and an air outlet at the top thereof. The flying chamber (A) is made of tensioned sheet material (6). A plurality of motor/fan units (11) are provided for producing an upward stream of air within the flying chamber (A).

26 Claims, 4 Drawing Figures

SKYDIVING SIMULATOR

This invention relates to apparatus for supporting a human body in a floating condition, and in particular to a skydiving simulator, that is to say an apparatus for simulating the free fall conditions experienced by a human body falling through the air at its terminal velocity.

Until recently, it was possible for a person to experience free fall conditions (that is to say to practise skydiving) only during a parachute descent and before the parachute had opened. Skydiving is a stimulating pleasurable activity, and requires the development of special skills, particularly the muscular control and coordination necessary to vary the orientation of the body. Obviously, considerable practice is necessary to acquire such skills. Unfortunately, the cost of skydiving is considerable, as each parachute jump is itself extremely expensive, and results in only a few minutes in free fall conditions. As each parachute jump takes a considerable time (as it involves initial preparations, and the landing and taking-off of the aircraft concerned), it is not usually possible for a skydiver to make more than three or four jumps a day. Consequently, it can take a considerable time for a skydiver to learn the necessary skills to produce a high quality of performance. This problem is often exacerbated by bad weather, as, for safety reasons, skydivers only operate when the weather is good. Thus, although the sport of skydiving is becoming increasingly popular, its popularity is limited by the considerable expense involved, and the time taken to learn the necessary skills.

Another problem limiting the popularity of skydiving is that it is a relative dangerous sport. Moreover, many people are too timid to jump out of an aircraft just for the sake of a few minutes pleasurable experience.

In an attempt to reduce the costs and dangers of skydiving, skydiving simulators have been built. Such skydiving simulators are basically vertical wind tunnels. Unfortunately, all the known simulators are extremely costly to build, being of a solid and permanent construction. Consequently, although the known simulators do reduce the cost and dangers of skydiving, they are still relatively expensive, and so very few have been built.

The aim of the present invention is to provide a skydiving simulator which is simple and cheap to manufacture, and which is easily transportable from site to site.

The present invention provides a skydiving simulator comprising a framework, a flying chamber supported within the framework, the flying chamber having an air inlet at the base thereof and an air outlet at the top thereof, and means for producing an upward stream of air within the flying chamber, wherein the flying chamber is made of tensioned sheet material.

The flying chamber of this simulator is easily removable from the framework, and the framework is demountable, so that the entire simulator can be taken down and transported to another site.

In a preferred embodiment, the flying chamber has a lower section whose side walls are substantially vertical, and an upper section whose side walls are inclined at a small angle to the vertical, the side walls of the upper section being divergent with respect to the central longitudinal axis of the flying chamber. Advantageously, the side walls of the upper section make an angle of between 10° and 15° with the side walls of the lower section. Preferably, said angle is 12°. The lower section of the flying chamber constitutes a flying section, and the upper section constitutes a diffuser section for slowing down the velocity of the air, and hence preventing a flyer rising too far up the flying chamber.

Advantageously, the side walls of the lower section of the flying chamber are made of transparent material. This permits the interior of the flying section to be observed from outside.

In a preferred embodiment, the flying chamber is made of a plurality of identical strips of sheet material which are joined together along their longitudinal edges. Advantageously, the longitudinal edges of the strips are zipped together. Preferably, each of the strips has a lower portion, an upper portion, and a flange extending along the entire length of one longitudinal edge, the lower strip portions defining the lower section of the flying chamber, the upper strip portions defining the upper section of the flying chamber, and the flanges being connected to the framework to tension the flying chamber. In this case, the lower portions of the strips are made of transparent laminated polyvinylchloride sheet material, and the upper portions and the flanges of the strips are made of a fire-resistant polyvinylchloride-coated woven polyester fabric, the upper portion, the lower portion and the flange of each strip being high frequency welded together.

In order to permit a flyer to enter the flying chamber, a removable access panel is conveniently provided in one of the lower strip portions. Preferably, the access panel is zipped into the associated lower strip portion.

Advantageously, each of the flanges is formed with a looped end portion, and a respective tensioning rod passes through each of said looped end portions, the tensioning rods being adjustably attached to the framework by means of screw-threaded members at the opposite ends thereof.

In a preferred embodiment, there are six strips of sheet material, and the flying chamber has a generally hexagonal configuration.

The upper section of the flying chamber may be provided with venting slots and/or vortex generators. These can be used to modify the velocity profile of the air flowing upwards through the flying chamber.

The framework may be constituted by a plurality of girders and a plurality of cross-pieces, the bases of the girders being fixable to the ground, and the top ends of the girders being interconnected by the cross-pieces. Advantageously, the girders are symmetrically disposed about the central longitudinal axis of the flying chamber, and are inclined to said axis with the bases of the girders further from said axis than the top ends of the girders. The framework may further comprise a plurality of vertical struts, there being the same number of vertical struts as there are girders, each vertical strut being positioned vertically below the top end of a respective girder. Preferably, the framework further comprises a platform positioned around the base of the flying chamber, the platform being supported on the vertical struts and by the girders. This platform provides a convenient place from which the interior of the flying chamber can be viewed. Where the flying chamber is hexagonal and constituted by six strips of material, there may be six girders and six cross-pieces.

In a preferred embodiment, the means for producing the air stream is constituted by a plurality of motor/fan units. Advantageously, each of the motor/fan units is provided with a curved duct, the curved duct having an inlet end surrounding the fan and an outlet end positioned at the base of the flying chamber. In order to facilitate with the efficient flow of air along the ducts, each of the ducts may be provided with internal baffles for directing the air stream from the inlet end to the outlet end thereof. Preferably, there are three motor-/fan units, each of which is mounted on a variable-angle stand.

Advantageously, a mesh grid is provided at the base of the flying chamber.

The invention also provides apparatus for supporting a human body in a floating condition, the apparatus comprising a framework, a flying chamber supported within the framework, the flying chamber having an air inlet at the base thereof and an air outlet at the top thereof, and means for producing an upward stream of air within the flying chamber, wherein the flying chamber is made of tensioned sheet material.

A skydiving simulator constructed in accordance with the invention will now be described, by way of example, with reference to the accompanying drawings, in which.

Figure 1:
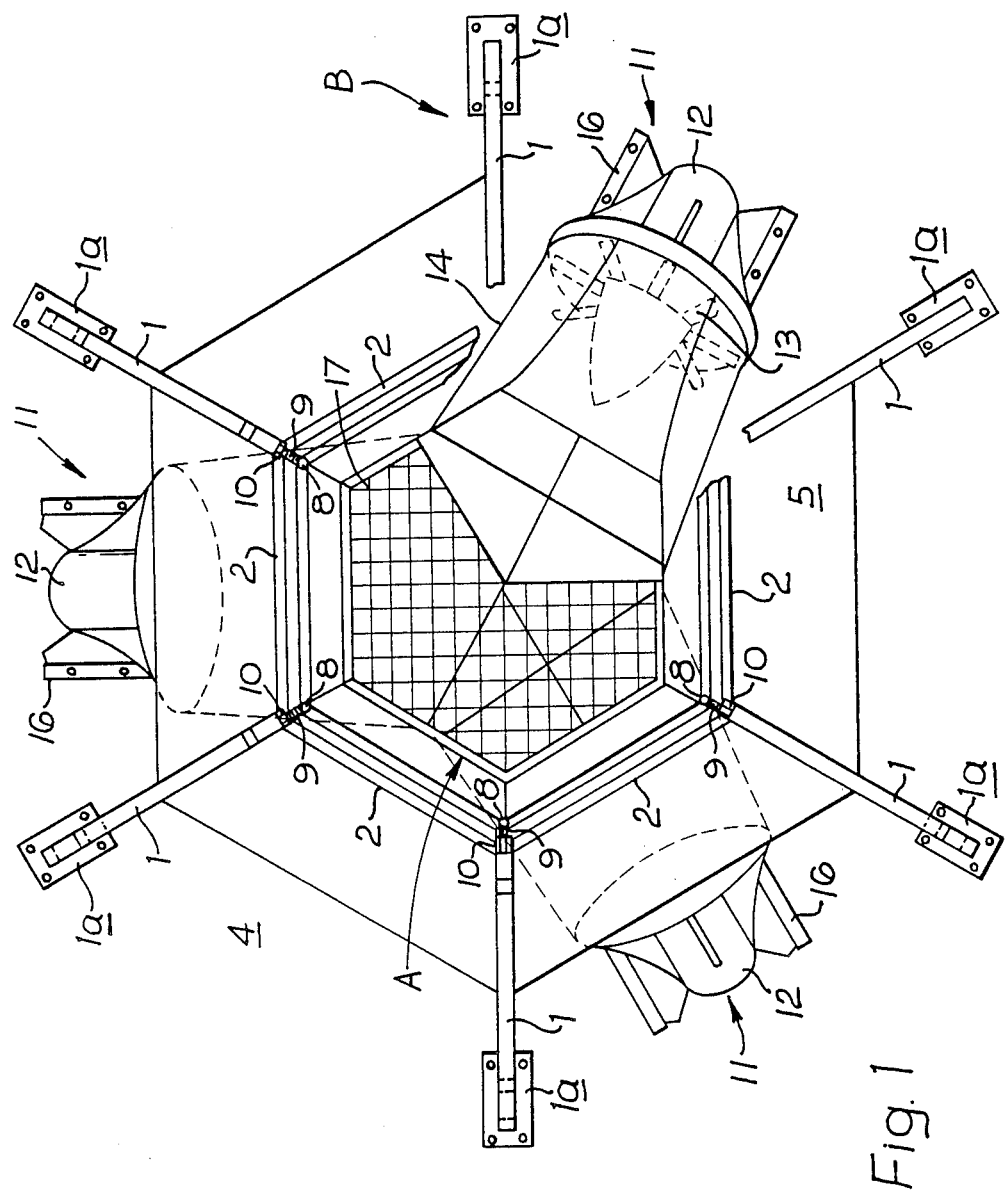
FIG. 1 is a plan view, partially broken away, of the simulator.

Referring to the drawings, the skydiving simulator comprises a flying chamber A which is supported by an outer framework B. The framework B includes six Warren girders 1, six cross-pieces 2, and six vertical struts 3. The girders 1, the cross-pieces 2 and the struts 3 are made of lightweight aluminium. The girders 1 are provided with base plates 1a which are bolted to a concrete base 4. The base plates 1a are positioned at the corners of a regular hexagon, and the girders 1 are inclined at a small angle to the vertical so that their top ends 1b also lie at the corners of a regular hexagon. The top ends 1b of the girders 1 are interconnected by the cross-pieces 2. The struts 3 are positioned vertically below the top ends 1b of the girders 1, and so lie at the corners of a regular hexagon that is the same size as that formed by the top ends 1b. The struts 3 are provided with base plates 3a which are bolted to the base 4. A platform 5 is supported on the tops of the struts 3 and by the girders 1. The platform 5 surrounds the flying chamber A, and so constitutes a viewing platform (as is described below).

The flying chamber A is made from six identical strips 6 of sheet material. Each strip has three portions, namely a lower portion 6a, an upper portion 6b and a flange 6c. The longitudinal edges of the upper and lower portions 6a and 6b of each pair of adjacent strips 6 are detachably connected together by zips 7 to form a generally hexagonal structure. The flanges 6c extend radially outwards from the corners of this hexagonal structure, the flanges being used to fasten the flying chamber A to the outer framework B in a manner to be described below. As shown best in FIGS. 2 and 3, each of the strips 6 is such that its portion 6b will naturally lie at an angle of about 12° to its strip 6a. Thus, the flying chamber A has two sections, namely a lower (flying) section A', and an upper (diffuser) section A''. As is described below, a person can enter the flying section A' to practise skydiving, and the diffuser section A'' is provided to prevent a flyer-rising too high in the flying chamber A. The strip portions 6a are made of transparent laminated polyvinylchloride sheet material, whereas the strips 6b and the flanges 6c are made of a fire-resistant polyvinylchloride-coated woven polyester fabric such as Trevira (Registered Trade Mark). The strips 6a are either sewn or high frequency welded to their strips 6b and flanges 6c. Thus, the strips 6a permit the interior of the flying section A' to be observed from outside, and in particular from the viewing platform 5. One of the strips 6a is provided with a panel 6d (shown in dashed lines in FIG. 2) which can be removed to enable a person to enter the flying section A'. Conveniently, this access panel 6d is zipped to the associated strip 6a.

Figure 3:
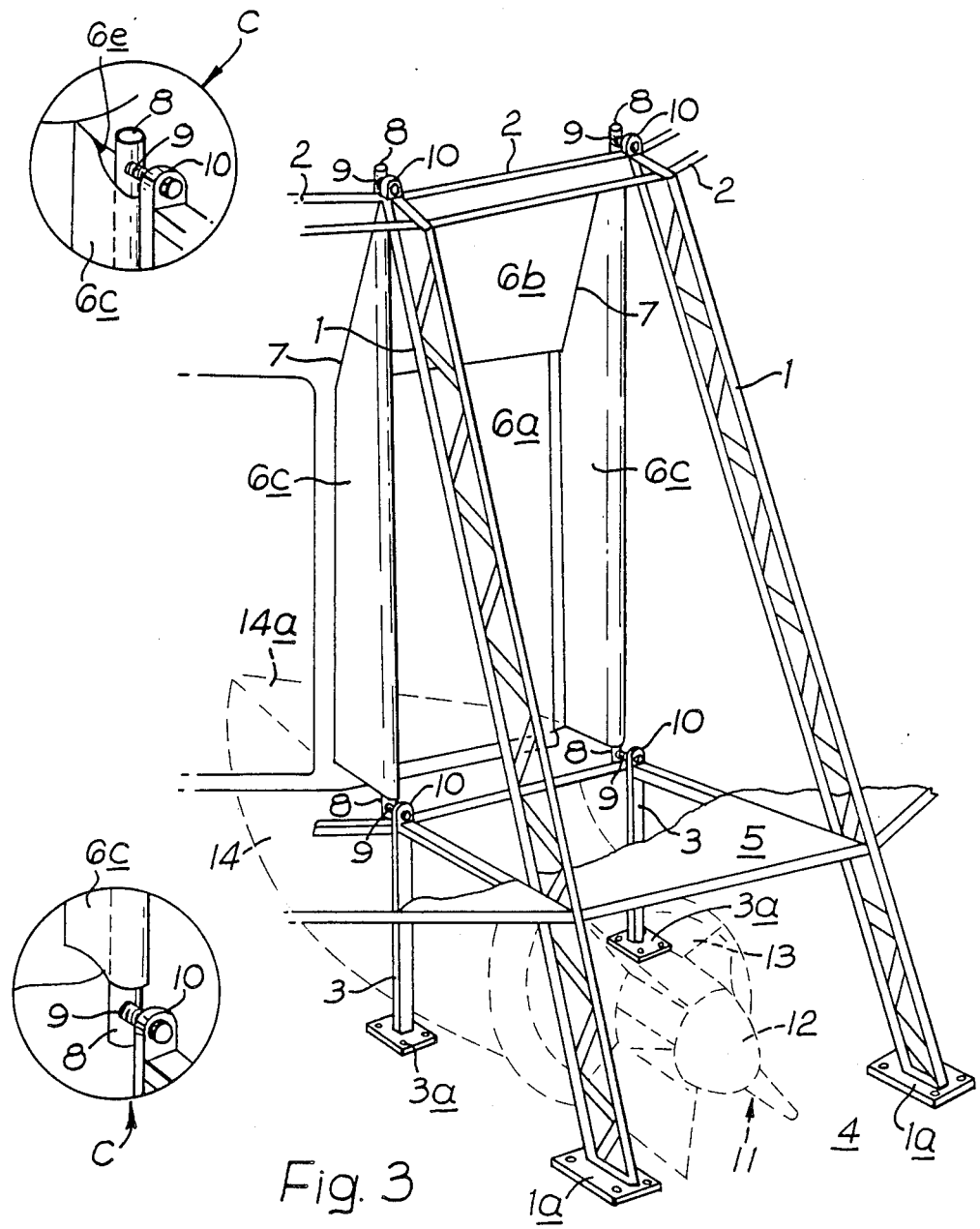
FIG. 3 is a perspective view of part of the simulator.

As shown in the inset portions (indicated by the arrows C) of FIG. 3, the end portion of each flange 6c is folded back on itself to form a closed loop 6e. A respective tensioning rod 8 passes through each of the loops 6e. Each tensioning rod 8 is provided with tensioning bolts 9 at the top and bottom ends thereof. These bolts 9 are adjustably connectible to brackets 10 provided at the top ends 1b of the girders 1 and on the platform 5 respectively. Hence, by suitably tightening the bolts 9, the flying chamber A can be supported within the outer framework B under tension.

Figure 2:
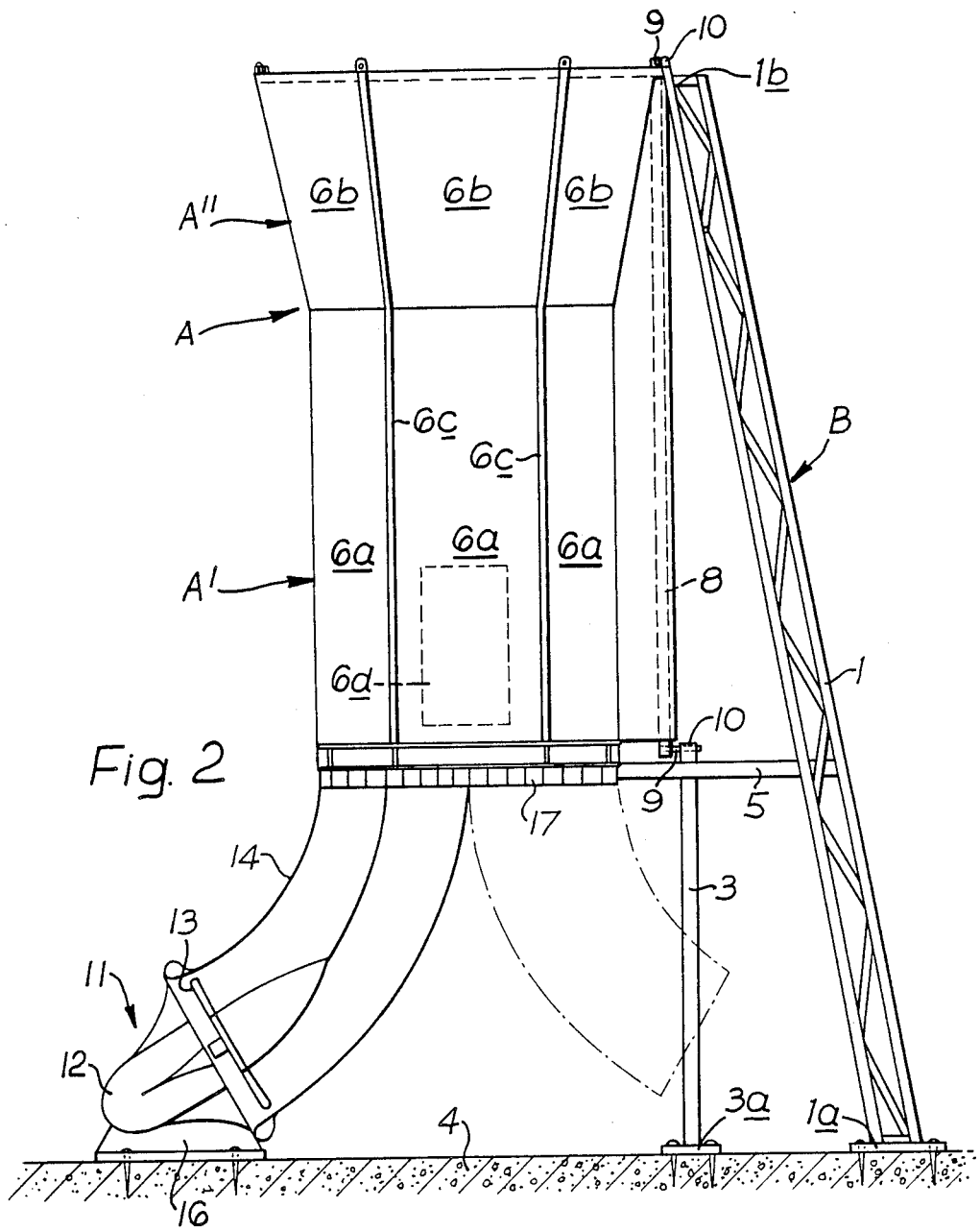
FIG. 2 is an end elevation of the simulator.
Figure 4:
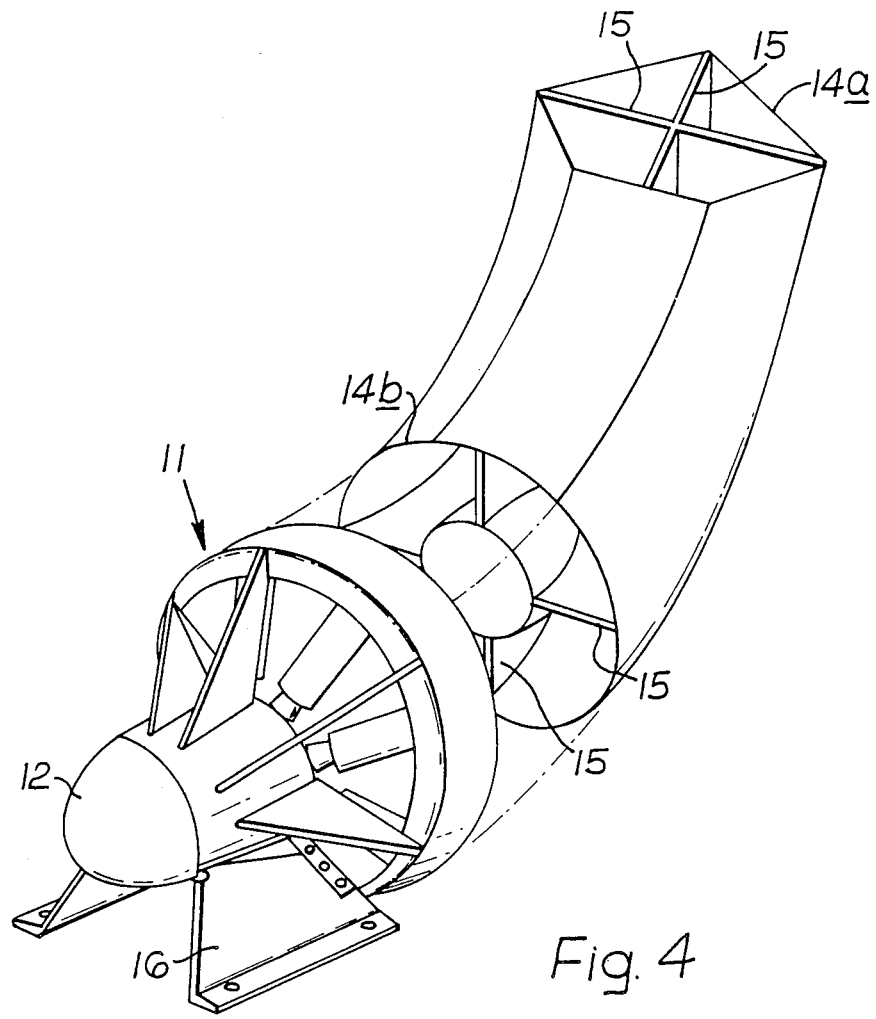
FIG. 4 is a perspective view of a motor/fan unit forming part of the simulator.

The flying chamber A is supplied with an upwardly-directed stream of air by three motor/fan units 11. As shown in FIG. 1, the motor/fan units 11 are equispaced with respect to the vertical longitudinal axis of the flying chamber A. Each of the units has a motor 12, a fan 13 and a curved duct 14 for directing the air output of the fan vertically upwards into the flying chamber A. Moreover, as shown in FIG. 4, the upper outlet end 14a of each duct 14 is of smaller cross-sectional area than its lower inlet end 14b. Consequently, as air enters the flying chamber A, it is accelerated owing to the venturi effect. Each duct 14 is provided with internal baffles 15 for deflecting the air efficiently through the required angle. Each of the motors 12 is mounted on a variable-angle stand 16, so that each of the motors can be bolted to the base 4 in such a manner that the direction of the air stream pushed out by its fan 13 can be varied. As shown in FIG. 2, the motors 12 are angled so that their output air streams are directed at angles of about 60° to the horizontal.

A mesh grid 17 is provided at the base of the flying chamber A just above the outlet ends 14a of the ducts 14. The grid 17 is provided to prevent persons in the flying section A' from seeing the fans 13. The grid 17 would also prevent persons falling into the ducts 14 in the event of a failure of the motors or a substantial reduction in their output.

In use, a user enters the flying section A' via the access panel 6d. The motors 12 are rated so as to provide an upward stream of air of sufficient velocity to support a flyer floating in the flying section A'. As mentioned above, the upper divergent section A'' of the flying chamber A defined by the strip portions 6b constitutes a diffuser, and so prevents a flyer from being lifted by the air stream out of the top of the flying chamber. In other words, the flying section A' of the flying chamber A acts as a venturi tube, while in the section A'' the air is slowed down before it is discharged into the atmosphere, thereby preventing a flyer from rising too high in the flying chamber. It has been found, in practice, that the angle of divergence of the upper section of the flying chamber A should be between about 10° and about 15°. In the embodiment shown, this angle is 12°.

It will be apparent that the simulator described above could be modified in a number of ways. For example, the height of the structure and the lengths of the air ducts 14 could be altered to provide different velocity profiles within the flying section A' of the flying chamber A. In particular, the motors 12 could be positioned so that the fans 13 emit air horizontally. This has the advantage of the increasing safety as the fans are further away from the flying chamber A. Unfortunately, it means that the ducts 14 must be considerably longer than those shown, so that the overall size of the structure is increased and some efficiency is lost. It is also possible to reduce energy losses by varying the diffuser angle (that is to say the angle of divergence of the diffuser section A" of the flying chamber A), or by producing re-energising air slots, vortex generators screens and turning vanes in the upper section. Swirl may be reduced by pre-rotational vanes and nacelles, along with symmetrical straightener vanes. Airflow control can be achieved by providing venting slots in the diffuser section A" of the flying chamber A, or by an A.C./D.C. electric or internal combustion motor speed controller fed by pressure/flowmeter transducers in the flying section A'.

It would also be possible to house the simulator within a permanent or temporary building structure. Particularly where transportability is desirable, it is preferable to provide the simulator with a temporary, easily-transportable building structure. For example, a building structure having a framework made of Warren girders and a covering made of tensioned sheet material is particularly suitable. Such a structure is manufactured by Spandrel Orbits Structures Ltd.

It will be apparent that the skydiving simulator described above has a number of advantages compared with known arrangements. In particular, it is of modular construction and can be manufactured at a relatively low cost from a small number of standard parts. Moreover, it can be supplied in kit form and is easy to transport and erect, so that the simulator can be sited practically anywhere (the only site requirement being a solid base on which to bolt the structure). The girders 1 and cross-pieces 2 being made of lightweight aluminium facilitate the transportability of the structure.

Another advantage of this simulator is that the flying chamber A is made of sheet material. This provides a cushioning effect if impacted by a flyer. Moreover, constructing the flying chamber A from tensioned sheet material is cheaper than covering a solid-walled flying chamber with foam cushioning. The use of transparent sheet material for the flying section A' has obvious advantages (not present in solid prior art simulators) of allowing spectators and instructors to observe flyers, as well as facilitating filming and photography.

As described above, the use of sheet material also facilitates the formation of the diffuser section A" which is an important safety feature preventing a flyer from rising too high. Without this diffuser section A" there would be a risk of a child (or a slightly-built adult) being lifted right out of the top of the flying chamber A if the velocity of the upward air stream in the flying chamber was too high. Obviously, flyers of different weights will tend to fly at different heights within the flying section A' of the flying chamber A (with heavier flyers nearer the base of the flying section), and so, without the provision of the diffuser section A", there would be a danger of a lightweight flyer rising out of the top of the flying chamber A, even if the outputs of the motors 12 were varied to try and prevent this happening.

Another important advantage of this simulator is its versatility. Thus, because of its modular construction, it is a relatively simple task to increase its size. The embodiment described is intended for a single flyer. However, if a larger simulator is required (say for two or four flyers), the entire structure can be increased in size by adding further girders 1 and cross-pieces 2, and by zipping in further strips 6 of sheet material. For example, by using twelve girders 1, twelve cross-pieces 2, twelve struts 3, and twelve strips 6, a four-man simulator could be made. In this case, twelve motor/fan units 11 would be required, and the flying chamber A would have the shape of a regular dodecagon.

Yet another advantage of the simulator described above is that the motor/fan units 11 are not positioned below the flyer, so there is no chance of the flyer falling into rotating parts in the event of a reduction in power. Moreover, by using a plurality of motor/fan units 11, the arrangement avoids the safety and balancing problems of one large rotating mass. Furthermore, in the event of one motor/fan unit 11 failing, a flyer would not fall heavily to the base of the flying chamber A, but would gradually descend owing to the upstream of air from the remaining units. As mentioned above, the use of a plurality of motor/fan units 11 facilitates the enlargement of the simulator, as it is relatively easy to add further standard units as the size of the flying chamber A is increased.

The provision of the mesh grid 17 has a psychological advantage in that it prevents a flyer looking down the ducts 14 and seeing the fans. Thus, a flyer is not disturbed by seeing moving parts even though the simulator is designed to prevent anyone falling into such moving parts.

The simulator described above can be used not only for training skydivers, but also for military training of parachutists, as a recreational attraction in fun fairs and amusement parks, or even for medical and therapuetic purposes.

We claim:

1. A skydiving simulator comprising a framework (B), a flying chamber (A) supported within the framework (B), the flying chamber (A) having an air inlet at the base thereof and an air outlet at the top thereof, and means (11) for producing an upward stream of air within the flying chamber (A), wherein the flying chamber (A) is made of tensioned sheet material (6), and the flying chamber (A) having a lower section (A'), whose side walls (6a) are substantially vertical about a central longitudinal axis, and the flying chamber (A) further having an upper section (A"), concentrically mounted about the central longitudinal axis and having a lower end coincident with the upper end of the lower section (A'), and the side walls (6b) of the upper section (A") inclined at a small angle to the vertical and divergent with respect to the central longitudinal axis, whereby the upper end of the upper section (A") has a larger cross-sectional area than the lower end of the upper section (A").

2. A simulator as claimed in claim 1, wherein the lower section (A') of the flying chamber (A) is generally cylindrical and the upper section (A") is generally frusto-conical and the flying chamber (A) is provided with a plurality of venting slots.

3. A simulator as claimed in claim 1, wherein the side walls (6b) of the upper section (A") make an angle of between 10° and 15° with the side walls (6a) of the lower section (A').

4. A simulator as claimed in claim 3, wherein the side walls (6b) of the upper section (A") make an angle of 12° with the side walls (6a) of the lower section (A').

5. A simulator as claimed in claim 4, wherein the side walls (6a) of the lower section (A') of the flying chamber (A) are made of transparent material.

6. A simulator as claimed in claim 5, wherein the flying chamber (A) is made of a plurality of identical strips (6) of sheet material which are joined together along their longitudinal edges.

7. A simulator as claimed in claim 6, wherein the longitudinal edges of the strips (6) are zipped together.

8. A simulator as claimed in claim 7, wherein each of the strips (6) has a lower portion (6a), an upper portion (6b), and a flange (6c) extending along the entire length of one longitudinal edge, the lower strip portions (6a) defining the lower section (A') of the flying chamber (A), the upper strip portions (6b) defining the upper section (A") of the flying chamber (A), and the flanges (6c) being connected to the framework (B) to tension the flying chamber (A).

9. A simulator as claimed in claim 8, wherein the lower portions (6a) of the strips (6) are made of transparent laminated polyvinylchloride sheet material.

10. A simulator as claimed in claim 9, wherein the upper portions (6b) and the flanges (6c) of the strips (6) are made of a fire-resistant polyvinylchloride-coated woven polyester fabric, and wherein the upper portion (6b), the lower portion (6a) and the flange (6c) of each strip (6) are high frequency welded together.

11. A simulator as claimed in claim 10, wherein a removable access panel (6d) is provided in one of the lower strip portions (6a).

12. A simulator as claimed in claim 11, wherein the access panel (6d) is zipped into the associated lower strip portion (6a).

13. A simulator as claimed in claim 10, wherein each of the flanges is formed with a looped end portion (6e), and wherein a respective tensioning rod (8) passes through each of said looped end portions (6e), the tensioning rods (8) being adjustably attached to the framework (B) by means of screw-threaded members (9) at the opposite ends thereof.

14. A simulator as claimed in claim 13, wherein there are six strips (6) of sheet material, and the flying chamber (A) has a generally hexagonal configuration.

15. A simulator as claimed in claim 1, wherein the flying chamber (A) is provided with a plurality of vortex generators.

16. A simulator as claimed in claim 15, wherein at least one of the venting slots and vortex generators are provided in the upper section (A") of the flying chamber (A).

17. A simulator as claimed in claim 1, wherein the framework (B) is constituted by a plurality of girders (1) and a plurality of cross-pieces (2), the bases (1a) of the girders (1) being fixable to the ground, and the top ends (1b) of the girders (1) being interconnected by the cross-pieces (2).

18. A simulator as claimed in claim 17, wherein the girders (1) are symmetrically disposed about the central longitudinal axis of the flying chamber (A), and are inclined to said axis with the bases (1a) of the girders (1) further from said axis than the top ends (1b) of the girders (1).

19. A simulator as claimed in claim 18, wherein the framework (B) further comprises a plurality of vertical struts (3), there being the same number of vertical struts (3) as there are girders (1), each vertical strut (3) being positioned vertically below the top end (1b) of a respective girder (1).

20. A simulator as claimed in claim 19, wherein the framework (B) further comprises a platform (5) positioned around the base of the flying chamber (A), the platform (5) being supported on the vertical struts (3) and by the girders (1).

21. A simulator as claimed in claim 14, wherein there are six girders (1) and six cross-pieces (2).

22. A simulator as claimed in claim 1, wherein the means for producing the air stream is constituted by a plurality of motor/fan units, and each of said motor/fan units (11) are spaced horizontally radially outwardly from the air inlet to the flying chamber (A).

23. A simulator as claimed in claim 22, wherein the number of the plurality of motor/fan units (11) is three, and each of the motor/fan units 11 is provided with a curved duct (14), the curved duct having an inlet end (14b) surrounding the fan (13) and an outlet end (14a) positioned at the base of the flying chamber (A), and the inlet end (14b) having a larger cross-sectional area than the outlet end (14a).

24. A simulator as claimed in claim 23, wherein each of the ducts (14) is provided with internal baffles (15) for directing the air stream from the inlet end (14b) to the outlet end (14a) thereof.

25. A simulator as claimed in claim 23, wherein each of the motor/fan units (11) is mounted on a variable-angle stand (16), and the direction of air flow at the fan is in the range of 0° to 60° with respect to the horizontal, and the inlet end (14b) of the duct (14) is larger in cross-sectional area than the outlet end (14a) thereof.

26. A simulator as claimed in claim 25, wherein a mesh grid (17) is provided at the base of the flying chamber (A).

* * * * *